Jan. 3, 1961

L. ROCHEFORT 2,966,915

AUTOMATIC OR SEMI-AUTOMATIC INSTALLATION
FOR SURFACE-TREATING MECHANICAL PARTS

Filed March 11, 1958

Inventor:
Lionel Rochefort
by: Michael S. Striker
Attorney

Jan. 3, 1961 L. ROCHEFORT 2,966,915
AUTOMATIC OR SEMI-AUTOMATIC INSTALLATION
FOR SURFACE-TREATING MECHANICAL PARTS
Filed March 11, 1958 3 Sheets-Sheet 3

Inventor:
Lionel Rochefort
by:
Michael S. Striker
Attorney

United States Patent Office 2,966,915
Patented Jan. 3, 1961

2,966,915

AUTOMATIC OR SEMI-AUTOMATIC INSTALLATION FOR SURFACE-TREATING MECHANICAL PARTS

Lionel Rochefort, 7 Ave. Ledru-Rollin, Suresnes, France

Filed Mar. 11, 1958, Ser. No. 720,739

Claims priority, application France Mar. 15, 1957

8 Claims. (Cl. 134—76)

This invention relates to the surface treatment of mechanical or like parts and more particularly to an automatic or semi-automatic installation for the surface treatment of mechanical parts mounted on supports or enclosed in drums or barrels. This installation is particularly but not exclusively suitable for carrying out electrolytic treatments such as nickel plating, chromium plating, etc.

The installation according to this invention is characterized in that it comprises a line or chain of stations which consists of a series of operating vessels aligned side by side, at least one of said conveyors being provided with means supporting or suspending the support or barrel for transferring the parts to be treated and comprising on the one hand mechanical means for causing said supporting or suspending members to travel to and from the treatment vessels, and on the other hand mechanical means adapted to cause said conveyor to move in one or the other direction along said line of treatment vessels; on each conveyor at least one electromotor for driving said mechanical means; and a set of electrical connections controlling the operation of the mechanical means associated with each conveyor, said connections being controlled in turn, if necessary, by an automatic control "brain" adapted to synchronize and regulate the operation of the various mechanical component elements of each conveyor.

Preferably, the installation according to this invention comprises in addition at either end of the chain or line of treatment vessels a carriage, trolley or gantry for loading or unloading the supports carrying the parts to be treated or the barrels containing these parts, and the supporting or suspension members provided on each conveyor are adapted to remove or receive the support of the parts or the barrel from the loading carriage, trolley or gantry in order to transfer them to the unloading carriage, trolley or gantry at the end of the treatment or operation.

According to a preferred embodiment of this invention, each mounting is received, in the conveyor, by a lazy tongs supporting assembly adapted to accomplish up and down vertical movements and to lift the mounting in order to enable it to clear operating vessels and to be subsequently lowered into other operating vessels; on the other hand, the displacement of each conveyor along the chain or line is ensured by equipping the conveyor in the fashion of a vehicle mounted on crawler-tracks or wheels.

These various members as well as the accessory component elements of the carriages, trolleys or gantries (which will be described presently) are driven from electromotors the energization of which is controlled entirely or partially from an electronic "brain" unit adapted automatically or semi-automatically to adjust their operation by co-ordinating and synchronizing the operative and inoperative periods and more generally by controlling the various steps of this operation.

In order to afford a clearer understanding of the installation according to this invention and of the manner in which the same operates and may be carried out in the practice, a typical embodiment thereof will be described hereafter with reference to the accompanying drawings forming part of this specification and illustrating diagrammatically by way of example an installation for carrying out various electrolytic processes.

Figure 3:
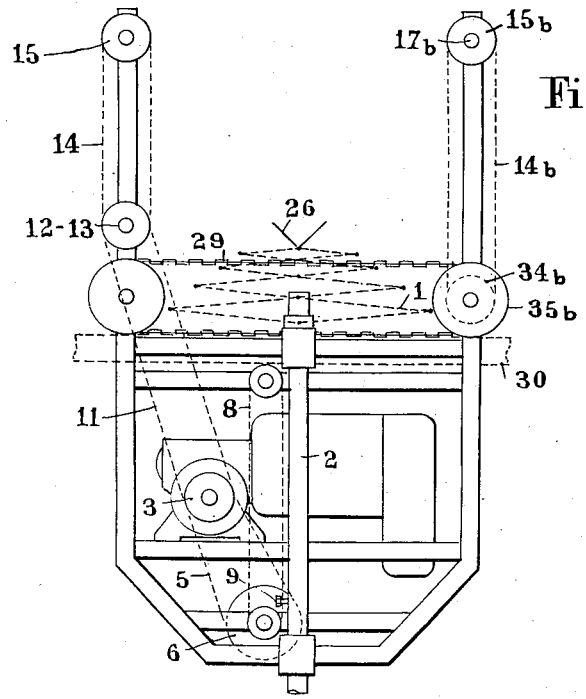
Figure 4:
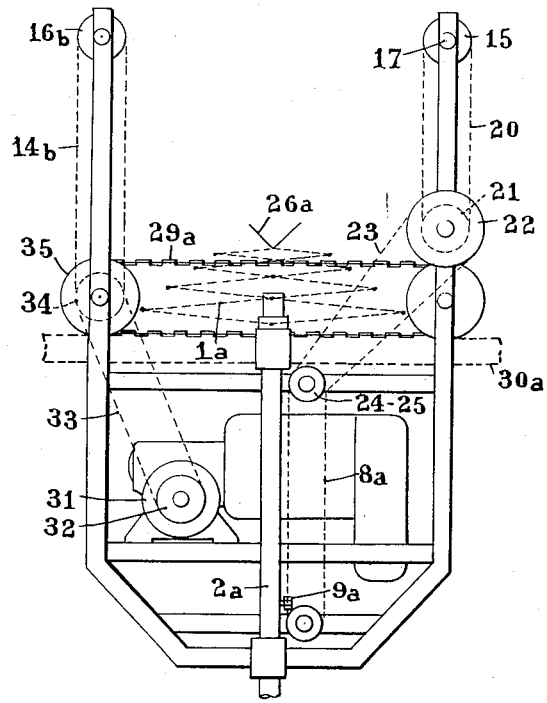
Figure 5:
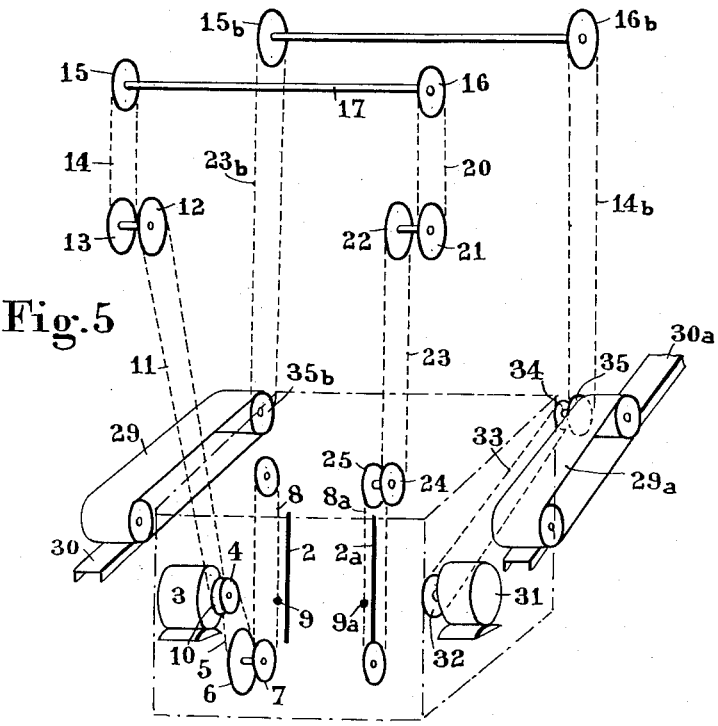

Figures 3 and 4 are diagrammatical elevational views showing the same conveyor as seen in a direction at right angles to its direction of travel respectively on the side of the mechanical members controlling the vertical up and down movement of the mounting supported by this conveyor (Fig. 3) and on the side of the mechanical members controlling its movement along the chain or line (Fig. 4); and Figure 5 is a diagrammatic perspective view illustrating the relative arrangement of the main mechanical elements of a conveyor.

In the embodiment illustrated in the drawings the stationary line or chain comprises (Fig. 1) a plurality of tanks $B_1$ for carrying out accessory treatments such as degreasing, scouring and or rinsing, a tank $B_2$ for effecting the treatment proper (for example nickel plating), and another set of tanks $B_3$ for accessory treatments or processes, a tank $B_4$ for carrying out another surface-treatment proper (for example chromium-plating), another set of accessory tanks $B_5$, and so on. In the same example, the installation comprises three conveyors $C_1$, $C_2$ and $C_3$.

Figure 2:
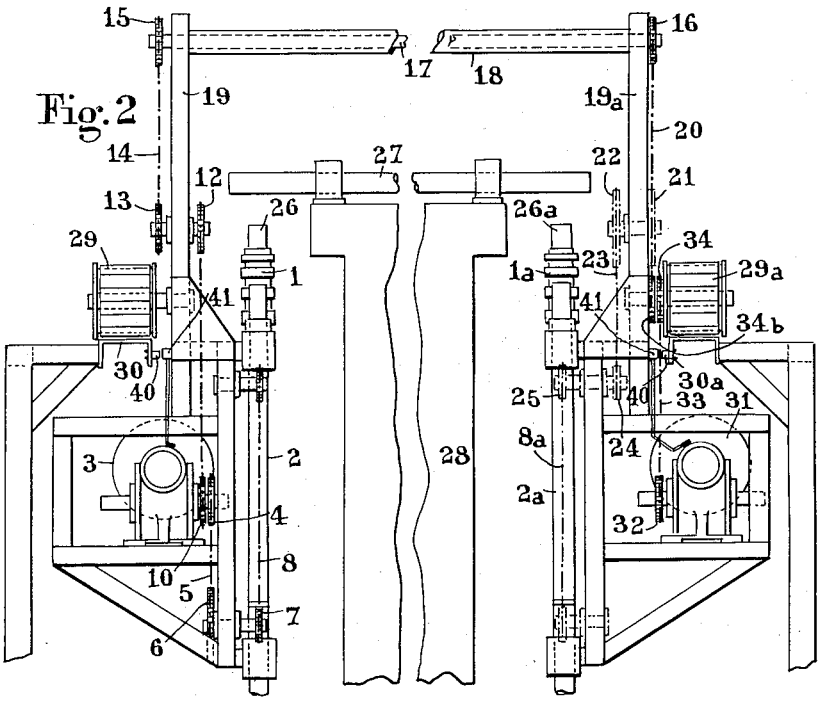
Figure 2 is an elevational view showing a conveyor as seen in the direction of its travel along the chain or line.

One conveyor is shown in detail in Figs. 2–4 and comprises a metal frame structure supporting on the one hand the members whereby vertical movements are imparted to the mounting supported by this conveyor, and on the other hand the members for displacing the conveyor in the horizontal direction, each of said two sets of members having its separate driving electromotor. The two motors of each conveyor are mounted on the conveyor proper, the one on one side and the other on the opposite side.

The elevating device for displacing the mounting in the vertical direction preferably consists of two lazy tongs supporting members which are shown at 1, 1a; the expansion and contraction of these supporting members are controlled by sliding rods 2, 2a respectively. The vertical up and down movements of these rods are obtained by the operation of the electromotor 3 (Figs. 2 and 3). The rod 2 is driven through the medium of a motor sprocket 4, a chain 5, sprockets 6, 7, and chain 8 carrying a driving stud 9 integral with or fixed to said rod 2.

The other rod 2a disposed on the other side of the installation is driven from a sprocket 10 through: chain 11, sprockets 12, 13, chain 14, sprockets 15, 16 carried by shaft 17, chain 20, sprockets 21, 22, chain 23, sprockets 24, 25 and chain 8a carrying—like the chain 8—a driving stud 9a integral with or fixed to the other rod 2a. As clearly shown in the drawings the shaft 17 is housed within the hollow cross-member 18 interconnecting the two uprights 19, 19a of the conveyor.

At the upper free portion of each supporting member 1, 1a V-shaped supporting or picking member 26, 26a is provided, respectively, these picking members being adapted during their upward movement to engage the upper cross-member 27 of the mounting and during their downward movement to retain this cross member under the action of the weight of this mounting.

Figure 1:
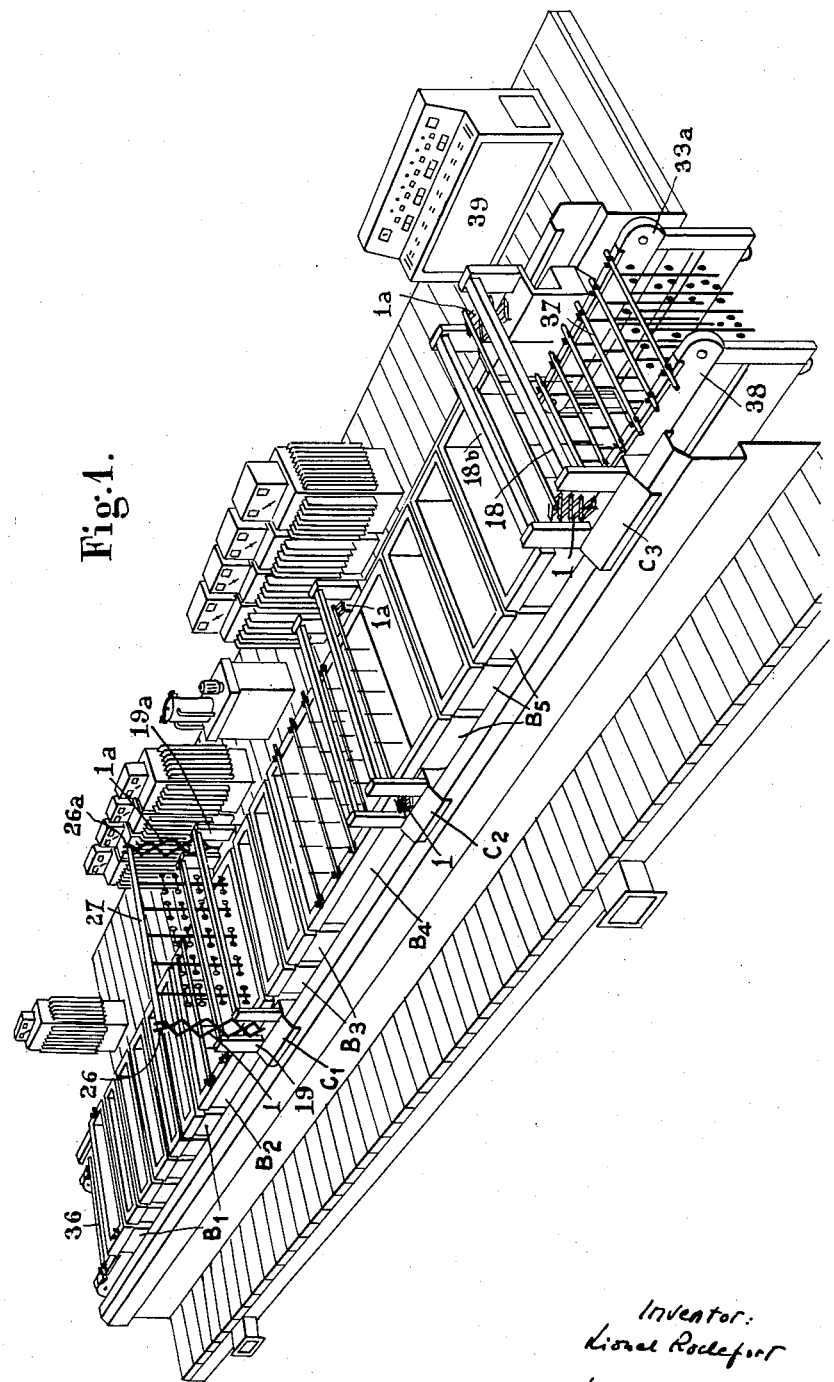
Figure 1 is a perspective view showing the complete installation.

Figure 2 illustrates a work or part 28 to be treated which is suspended from the aforesaid cross member 27;

Fig. 1 shows a complete view of this mounting in the upper position occupied thereby on the conveyor $C_1$.

The device provided for causing the conveyor to travel in the horizontal direction consists of a pair of crawler tracks 29, 29a running along corresponding runways 30. One of these crawler tracks, that is, the crawler track 29a, is driven from the electromotor 31 through the medium of a sprocket 32, chain 33 and sprocket 34; this sprocket 34 is keyed on the shaft carrying the crawler-track driving roller 35. Preferably, this roller 35 is formed with teeth in constant meshing engagement with corresponding teeth formed internally of the track 29a. Similarly, as provided for controlling the vertically movable members, the crawler track 29 driving the conveyor on the other side is driven from the same motor as the crawler track 29a. This motion is transmitted through: sprocket 34b, chain 14b, sprockets 15b, 16b of chain 23b, sprocket 34b and driving roller 35b. Both sprockets 15b and 16b are carried by a transverse shaft 17b mounted within the hollow cross member 18b.

The loading trolleys 36 and unloading trolleys 37 (of which one, namely the unloading trolley 37, is more clearly visible in Fig. 1 than the loading trolley 36) are each constructed in the form of a pair of endless belts 38, 38a supporting the end portions of the upper cross members 27 of the mountings. These endless belts are driven from an electromotor (not shown) mounted on the trolley and energized in synchronism with the conveyor movements so as to cause—during the operation of the installation—these belts to travel through a length equal to the relative spacing of two adjacent mountings.

The two trolleys may be controlled for example through the medium of a switch mounted on one of the conveyor runways and adapted to close the belt driving motor circuit upon arrival of a conveyor and to open the aforesaid circuit when a mounting has been substituted for a preceding one at a given station.

The installation described hereinabove operates as follows:

Assuming that the conveyor $C_1$ is to take from the trolley 36 the mounting which is the foremost as a consequence of the synchronism explained hereinabove; in this case, the supporting members 1, 1a of this conveyor will be firstly contracted or compressed within the trolley, and then expanded to carry the mounting upwards. The conveyor $C_1$ advances and the same movements take place above each tank $B_1$. Then the mounting is left in the last tank and the conveyor $C_1$ is returned backwards to take the next mounting. At the same time, the conveyor $C_2$ which was disposed above the first tank of the series $B_3$ moves to the rear and takes from the last tank of the series $B_1$ the first mounting in order to deposit same in the foremost portion of the treatment tank $B_2$ in which, for example, a nickel-plating operation is carried out. This operation is repeated until the conveyor $C_2$ can bring a mounting in the foremost place of said tank which has been made free by the fact that the conveyor $C_3$ associated with the "Chromium Plating" series of tanks has taken therefrom the mounting in order to impart thereto the movements necessary to perform the "Chromium Plating" operation and finally release it on the unloading trolley 37. Of course, the operation of the conveyor $C_3$ is the same as that of conveyors $C_1$ and $C_2$ and its movements are synchronized with those of these two conveyors. Regarding the motor driving the endless belt of trolley 37, its energization is also synchronized with the displacements of conveyor $C_3$ to advance the mountings as these are released thereon by this conveyor.

The different operations whereby the control motors are energized and de-energized are obtained by providing adequate hand-controlled switches carried by the conveyors themselves. However, these operations are obtained preferably wholly or partially in an automatic or semi-automatic manner, depending whether the installation is of the automatic or semi-automatic type, by means of switches 40 suitably arranged along the path of the moving units, for example on the runways or rails 30, 30a, these switches being adapted to be engaged by control members or contacts 41 carried by the conveyor and connected to the electromotor on the corresponding side. These various means for energizing and de-energizing the electromotors may be controlled from a central "brain" of electronic or like character adapted more particularly to synchronize the various operative steps. On the other hand, a control desk 39 is shown in Figure 1. Of course, the switch control gears are arranged as a function of the desired operations and according to the treatments to be carried out by the installation. The relative time spacing between these control actions and their sequence may differ widely according to the specific cases and applications contemplated, the same also applying to the shape, type and material of the tanks, as well as to the number of conveyors contemplated, which may differ widely.

On the other hand, it is evident that the object of this invention is not limited to the installation described and illustrated which constitutes but a simple and typical example, as many modifications and alterations may be made without departing from the basic principle of the invention as set forth in the appended claims. Thus, the conveyors may be mounted on wheels instead of crawler tracks. Moreover, the installation may be adapted in view of applying specific treatments to parts contained in bulk in vessels or barrels of adequate shape, for example cylindrical, which are rotated from a motor mounted thereon or independent therefrom. In this case each vessel or barrel is conveyed according to needs in the same manner as the transverse rods 37 constituting the mounting-carrying trolleys of the example illustrated and described herein by way of example.

What I claim as new is:

1. An installation for applying a surface treatment to parts carried by a holder, which comprises in combination a stationary line of treatment vessels aligned side by side, two runways disposed respectively on either side of said line of treatment vessels, at least one conveyor having the general form of an inverted U which is adapted to straddle the tanks of said line, on each side of said conveyor at least one roller member provided with driving means, disposed on the relevant runway, on each side of said conveyor a lazy tongs supporting member constituting a vertically extensible and retractable assembly, each supporting member carrying on its upper end a picking member adapted to support temporarily said holder, a vertically movable rod controlling the expansion and retraction of said supporting members, and an electromotor on either side of said conveyor, one electromotor being operatively connected to the roller member driving means, the other electromotor being operatively connected to said vertically movable rods to operate said supporting members in order to drive said holder toward and away from said vessels.

2. An installation as set forth in claim 1, wherein the one electromotor is operatively connected on the one hand to the means driving the roller member disposed on the same side of the conveyor through the medium of a chain and sprocket wheels therefor, and on the other hand, to the means driving the roller member disposed on the other side of the conveyor through the medium of chains and sprocket wheels therefor as well as a transverse shaft adapted to straddle the tanks of said line.

3. An installation as set forth in claim 1, wherein the other electromotor is operatively connected on the one hand to the vertically movable rod disposed on the same side of the conveyor through the medium of chains and sprocket wheels therefor, one of said chains carrying a driving stud fixed to said rod, and on the other hand to the other rod disposed on the other side of the conveyor, through the medium of chains and sprocket wheels therefor, as well as a transverse shaft adapted to straddle the tanks of said line, one of said chains carrying a driving stud, fixed to said rod.

4. An installation as set forth in claim 1, which comprises in addition, at one end of said stationary line of treatment vessels, a loading carriage adapted to carry at least one of said holders of parts to be treated, and, at the other end, an unloading carriage adapted to carry at least one of said holders of parts the treatment of which is completed, the supporting members provided on each of said conveyors being adapted respectively to remove each holder from said loading carriage and to deposit same on to said unloading carriage.

5. An installation for applying a surface treatment to parts carried by a holder which comprises, in combination, a stationary line of treatment vessels aligned side by side; two runways, each disposed at one side of said line of treatment vessels; and at least one conveyor having the general form of an inverted U and adapted to straddle the vessels, said conveyor comprising roller means provided at each side of said conveyor and disposed on the respective runway; driving means for the roller means, an elevating device comprising vertically reciprocable means at each side of said conveyor, each said vertically reciprocable means having an upper end and supporting means at said upper end adapted to releasably support said holder, and an electromotor at each side of said conveyor, one of said electromotors operatively connected with said driving means and the other electromotor operatively connected with and adapted to reciprocate said vertically reciprocable means whereby to move said holder toward and away from said vessels.

6. An installation for applying a surface treatment to parts carried by a holder which comprises, in combination, a stationary line of treatment vessels aligned side by side; two runways each disposed at one side of said line of treatment vessels; and at least one conveyor having the general form of an inverted U and adapted to straddle the vessels, said conveyor comprising at least one roller member provided at each side of said conveyor and disposed on the respective runway, driving means for said roller members, an elevating device comprising at least one vertically reciprocable rod at each side of said conveyor, each rod having an upper end and a picking member at said upper end, an electromotor at each side of said conveyor, first chain and sprocket means drivingly connecting one of said electromotors with the driving means for the roller member at one side of said conveyor, a transverse shaft adapted to straddle the vessels of said line and driven by said first chain and sprocket means, and second chain and sprocket means drivingly connecting said transverse shaft with the driving means for the roller member at the other side of said conveyor, the other electromotor operatively connected with and adapted to reciprocate said rods whereby to move the holder toward and away from said vessels.

7. An installation for applying a surface treatment to parts carried by a holder which comprises, in combination, a stationary line of treatment vessels aligned side by side; two runways, each disposed at one side of said line of treatment vessels; and at least one conveyor having the general form of an inverted U and adapted to straddle the vessels, said conveyor comprising at least one roller member provided at each side of said conveyor and disposed on the respective runway, driving means for said roller members, an elevating device comprising at least one vertically reciprocablbe rod at each side of said conveyor, each rod having an upper end and a picking member at said upper end, an electromotor at each side of said conveyor, first chain and sprocket means drivingly connecting one of said electromotors with the rod at one side of said conveyor, a transverse shaft adapted to straddle the vessels of said line and driven by said first chain and sprocket means, and second chain and sprocket means drivingly connecting said transverse shaft with the rod at the other side of said conveyor whereby said rods and said picking members are adapted to move the holder toward and away from said vessels, and the other electromotor operatively connected with said driving means for moving the conveyor along said runways.

8. An installation for applying a surface treatment to parts carried by a holder which comprises, in combination, a stationary line of treatment vessels aligned side by side; two runways, each disposed at one side of said line of treatment vessels; and at least one conveyor having the general form of an inverted U and adapted to straddle the vessels, said conveyor comprising at least one roller member provided at each side of said conveyor and disposed on the respective runway, driving means for said roller members, and elevating device comprising at least one vertically reciprocable rod at each side of said conveyor, each rod having an upper end and a picking member at said upper end, an electromotor at each side of said conveyor, first chain and sprocket means drivingly connecting one of said electromotors with the driving means for the roller member at one side of said conveyor, a first transverse shaft adapted to straddle the vessels of said line and driven by said first chain and sprocket means, second chain and sprocket means drivingly connecting said transverse shaft with the driving means for the roller member at the other side of said conveyor, third chain and sprocket means drivingly connecting the other electromotor with the rod at one side of said conveyor, a second transverse shaft adapted to straddle the vessels of said line and driven by said third chain and sprocket means, and fourth chain and sprocket means drivingly connecting said second transverse shaft with the rod at the other side of said conveyor whereby said rods and said picking members are adapted to move the holder toward and away from said vessels.

References Cited in the file of this patent

UNITED STATES PATENTS

| | | |
|---|---|---|
| 956,189 | Schwarz | Apr. 26, 1910 |
| 1,846,053 | Hannon | Feb. 23, 1932 |
| 2,194,071 | Hine | Mar. 19, 1940 |
| 2,772,523 | Ruthner | Dec. 4, 1956 |